May 22, 1934.  C. T. WALTER  1,959,971
CONTAINER AND METHOD OF MAKING SAME
Filed April 16, 1932  2 Sheets-Sheet 1

Charles T. Walter
INVENTOR

BY
ATTORNEY

WITNESS

May 22, 1934.  C. T. WALTER  1,959,971
CONTAINER AND METHOD OF MAKING SAME
Filed April 16, 1932   2 Sheets-Sheet 2

Charles T. Walter
INVENTOR

WITNESS

Patented May 22, 1934

1,959,971

UNITED STATES PATENT OFFICE 1,959,971

CONTAINER AND METHOD OF MAKING SAME

Charles T. Walter, Chicago, Ill., assignor to Swift and Company, Chicago, Ill., a corporation of Illinois Application April 16, 1932, Serial No. 605,571

14 Claims. (Cl. 229—5.7)

This invention relates to containers and the method of making the same and more particularly to a novel ferrule and method of making the same whereby the end closure is secured to the ferrule and the ferrule secured to the end of the container. The adaptation of this invention is particularly applicable to containers having paper or fibrous body walls and ends.

One of the objects of this invention is to provide an inexpensive serviceable container particularly adapted, for example, to such products as scouring powders and the like.

Another object of the invention is to provide a ferrule adapted for attaching the ends to the side walls of such containers with a minimum metal waste.

Other objects of the invention will be apparent from the description and claims which follow.

Numerous containers have been proposed from time to time for scouring powders and similar products. One type of container, for example, is of all-metal construction. In this type of container the ends are secured to the side walls by providing the ends with extending flanges whereby a seamed joint may be formed.

More recently this class of goods has been marketed in containers of cylindrical form having fibrous side walls and metallic ends, the metallic ends being secured to the side walls by swedging an overlapping flange thereto.

One of the ends is provided with perforation scores whereby the user may secure a sifter top container by punching holes at the scores.

The present invention contemplates the use of fibrous ends in a container of this type. For convenience the description and drawings relate to a cylindrical container although it will be understood that containers of other shapes may be produced by the practice of the present invention, which employs a novel ferrule for securing the fibrous ends to the fibrous side walls of the container. The present invention contemplates the production of the ferrule without waste of metal as will be more particularly described, and unlike the conventional type of ferrule, the ferrule of the present invention is manufactured from flat blanks.

Attention is called to the accompanying drawings in which similar characters of reference in the several figures indicate similar parts:

Figure 12 shows a sheet of paper or the like, sealing the perforations from within.

Figure 1:
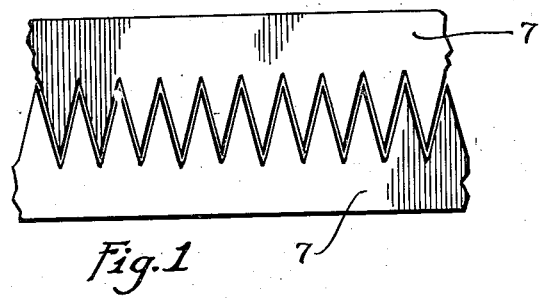
Figure 1 shows a portion of two strips from which blanks are to be prepared formed from one strip of metal.
Figure 3:
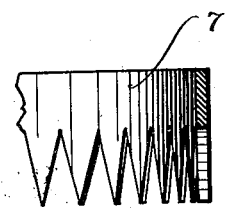
Figure 3 is a partial cross sectional view of the formed blank shown in Figure 2.
Figure 2:
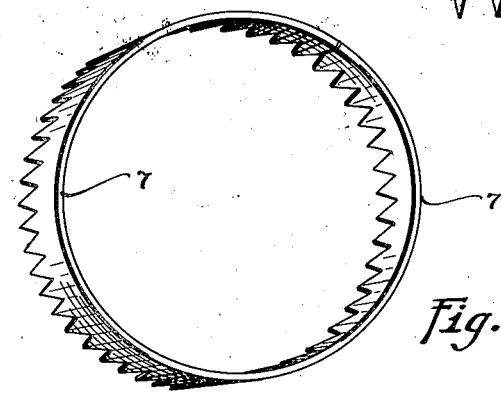
Figure 2 shows a blank bent in cylindrical shape, as upon a mandrel.
Figure 4:
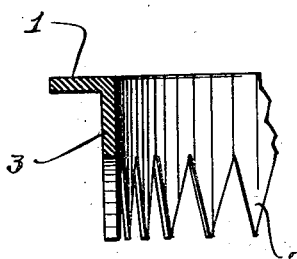
Figure 4 is a partial cross sectional view showing the blank in the next step of production wherein the flange 1 has been formed.
Figure 5:
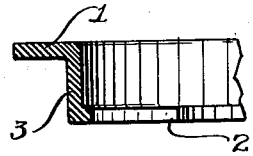
Figure 5 is a partial cross sectional view showing the next step in production, wherein the teeth 2 have been bent at right angles to the wall 3 of the ferrule, the teeth being directed inwardly.
Figure 6:
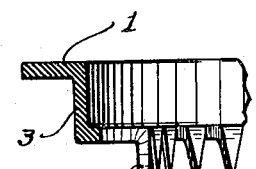
Figure 6 is a partial cross sectional view in the next step in the production of the ferrule showing the points 4 bent downwardly.
Figure 7:
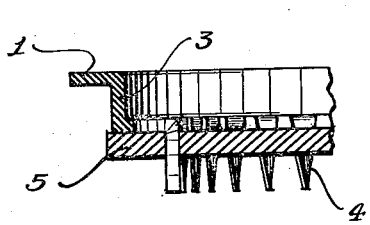
Figure 7 is a partial cross sectional view showing the next step in which the teeth 4 have been inserted through the fiber end 5.
Figure 8:
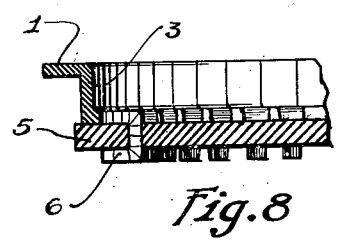
Figure 8 is a partial cross sectional view of the next step in the production of the container showing the tips 6 of the points bent outwardly to secure the ferrule to the fibrous top.
Figure 9:
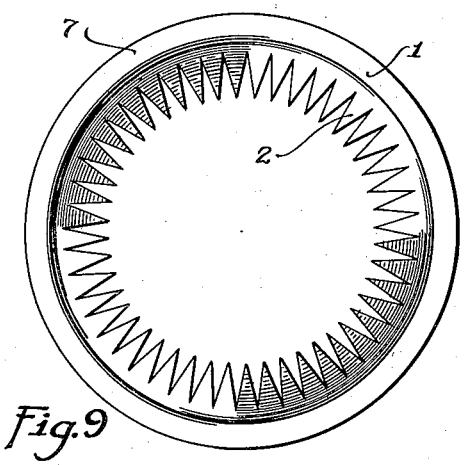
Figure 9 is a plan view of a ferrule before the tips of the teeth have been bent downwardly.

As will be seen by reference to the drawings the first step in forming the ferrule is shown in Fig. 1 wherein a thin strip of metal of sufficient width is stamped as shown to provide two ferrule blanks 7. The teeth and notches of each blank may be complementary. The strips are next cut into appropriate lengths and bent as upon a mandrel, otherwise, to the form shown in Figure 2. The flange 1 is formed on the plane or straight edge of the blank as shown in Figure 4. The teeth, or prongs, 2 are then bent inwardly as shown in Figure 5 and the tips 4 of the teeth 2 are bent downwardly as shown in Figure 6. The tips 4 are then driven through the fiber container end, or closure 5 as shown in Figure 7 and the ends 6 bent back on the other side of the container end, or closure as shown in Figure 8, thus securely fixing the ferrule to the container end, or closure. The ferrule with the closure or end 5 secured thereto may then be securely affixed to the side walls 8 of the container by swedging over the flange 1 as shown in Figures 11, 12, 13 and 14, such that the outer edge 9 is pressed into the fiber side walls 8.

The completed container, as will be manifest from the description of the method supra, comprises the container body proper 8, which is preferably of fibrous material, having affixed thereto the novel metal ferrule 7, the latter of which has fixedly secured to it the fibrous end or closure 5. The closure 5 fits snugly within the end portion of the container, and the periphery thereof is in engagement with the interior side walls of the container as shown in Figs. 11 to 14.

By referring to Figs. 11 to 14 inclusive, it will be further seen, that, the free end of flange 1 of the ferrule 7 is swedged at 9 into the exterior side walls of the container 8 adjacent its end, and a portion of the flange of the ferrule continuing from the said free end is in engagement with and parallel to the exterior side walls of the container and extending to the extreme end of the container and inwardly thereover and in engagement therewith and at a right angle to the said parallel portion, then extends in engagement with and parallel, as at 3, to the inner side walls of the container for a distance substantially equal to the first mentioned parallel portion, and then extends radially inwardly in engagement with the outer face of the end or closure 5, adjacent its periphery and the toothed portion 2 of the ferrule has pierced, passed into and entirely through the end or closure 5, adjacent the latter's periphery, at a right angle to the radially inwardly extending portion, and the tips or ends of the teeth are clenched against and parallel to the inner face of the end or closure 5; therefore, it will be seen that the closure 5 is fixedly secured to the ferrule and the ferrule is fixedly secured to the end portion of the container walls.

Figure 10:
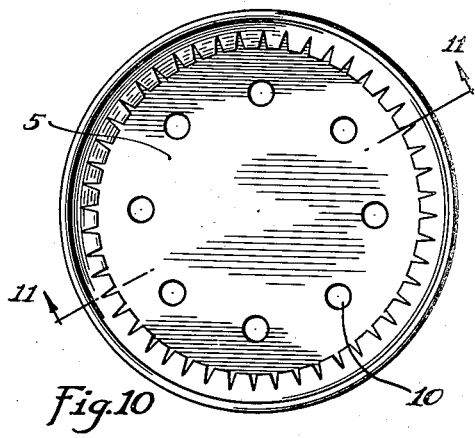
Figure 10 is a plan view showing the top of a container employing the ferrule.
Figure 11:
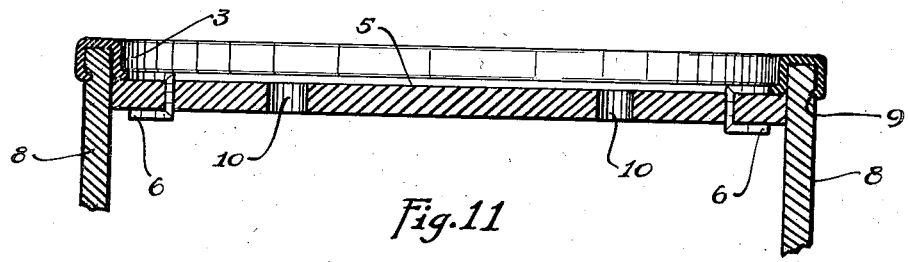
Figure 11 is a cross sectional view through line 11—11 of Figure 10 showing the container top or end closure and a portion of the side walls of the container.
Figure 12:
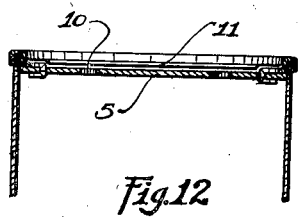
Figure 12 is a cross sectional view similar to Figure 11 showing the end of a container provided with a label over the perforations.
Figure 13:
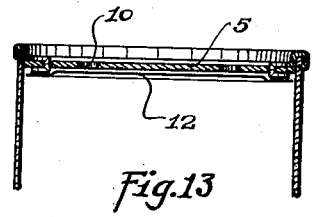
Figure 13 is similar to Figure 11 but unlike
Figure 14:
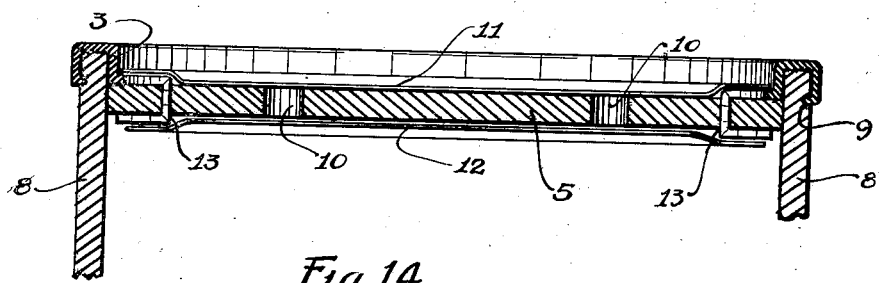
Figure 14 is similar to Figure 11 and shows the combination of the label of Figure 12 and the inner sheet of Figure 13.

The teeth 2 are bent substantially at a right angle intermediate their ends, as will be clearly seen in Figs. 6 and 7, and the right angled portion of the teeth pierces and projects entirely through and beyond the fibrous end closure and the tips or ends of the teeth 6 are clenched or bent back into engagement with one face of the end closure to fixedly secure the metal ferrule to the fibrous end closure. By bending the teeth intermediate their ends, it will be seen that in forcing the right angled portions of the teeth through the fibrous container top that the said top will not be completely severed, for the teeth so bent provide a space between each tooth when the teeth have been forced through the end closure, as will be clearly seen by referring to Fig. 10.

Where it is desired to provide a sifter type of container, perforations 10 are punched in one end of the container, the perforations preferably being formed before the ferrule is affixed to the counter. The perforations may be sealed by pasting paper over them. If desired, the perforations may be covered at both ends as by label 11 and sheet 12, although, in practice, one has been found sufficient. The label 11 may be, if desired, used for bearing advertising matter. The sheet 12 serves merely the function of retaining the powdered product within the container. It will be noted that label 11 and sheet 12 are shown of sufficient size to cover the exposed surfaces of those portions of the ferrule which are in contact with the surfaces of the counter. This feature eliminates the sifting and the consequent loss of product which might otherwise occur through the channels 13 through the container end or closure.

It will, of course, be readily understood that in ordinary practice only one end of the container would be perforated. Due to the use of the metallic ferrule the container has substantially as great strength as a container having fiber side walls and all metal ends but, as has been shown, the quantity of metal used is reduced to a minimum. The ends of the side walls are completely covered by metal and the fiber ends are depressed within the cylinder a distance equal to the depth of the wall 3 of the ferrule, thus avoiding contact with possible moisture present on surfaces upon which the container might be set in ordinary usage. If desired to still further decrease the possibility of damage by moisture, the imperforated end of the container may be treated with a water-proof varnish and if desired, the perforated end may also be so treated, although in ordinary practice this would not be necessary. It is understood that changes may be made in the construction of the ferrule of the container without departing from the spirit of the invention as described in the following claims:

What is claimed is:

1. In a container, the combination of a body formed of fibrous material, a ferrule shaped to conform to the body walls of the container, comprising a flange covering the ends of the body walls and swedged thereover and engaging the outer surfaces of said body walls, a vertical portion on the inside of said body walls and a plurality of spaced prongs engaging a fibrous end piece, said prongs having extending points passing through and clenched upon said fibrous end.

2. The method of preparing a ferrule adapted for securing a fibrous end to a container having fibrous side walls which comprises stamping a ferrule blank from a flat sheet of metal said blank being formed with one edge notched providing prongs, forming the blank of the desired shape, flanging the blank radially outwardly and bending the prongs radially inwardly and downwardly intermediate the ends of said prongs to provide means for engaging the fibrous end of the container.

3. The method of preparing a combination fibrous and metal end for a container having fibrous side walls, which comprises stamping a ferrule blank from a flat sheet of metal, said blank being formed with one straight edge and one pronged edge, forming the blank into the desired shape, flanging the straight edge outwardly and the notched edge inwardly, bending the prongs downwardly, intermediate of their ends at substantially a right angle and inserting the substantially right angled portions of the prongs in a fiber blank end closure of the desired shape and size, causing said prongs to pass completely through said fibrous blank and clenching the tips of said prongs on the opposite surface of said fibrous blank.

4. The combination fibrous and metal container end comprising a fibrous disk and a metal ferrule, said ferrule being secured to said disk by a plurality of prongs, said prongs being bent substantially at a right angle intermediate of their ends, the said bent right angled portions of the prongs passing through and clenching to said disk near the periphery thereof, and the outer edge of said ferrule being flanged.

5. In a container, the combination of a container body and an end closure of fibrous material, and a metallic ferrule provided with a plurality of spaced teeth projecting from and beyond one edge thereof and bent at substantially a right angle intermediate of their ends, the said right angled portions of said teeth piercing the end closure and serving as a means for securing together the ferrule and the end closure, and means for securing the ferrule to the container body.

6. A container as claimed in and by claim 5, whereby the container is of the sifter type by providing perforations in the end closure, and means for closing the perforations until said container is to be used as a sifter dispenser.

7. A container as claimed in and by claim 5, whereby the said end closure has an inner and an outer face, and the said right angled portions of the teeth of the ferrule pass completely through the fibrous end closure and project beyond one face thereof and are clenched thereto to fixedly secure the closure to the ferrule.

8. In a container, the combination of a container body and an end closure of fibrous material, the end closure having an inner and an outer face, and a toothed metallic ferrule, a portion of which is in engagement with and parallel to the inner side walls of the container, the said teeth of the ferrule being bent at substantially a right angle intermediate of their ends, and the said right angled portions of the said teeth of the ferrule passing into, through and beyond one face of the end closure and clenched thereto to secure the ferrule to the closure, and means for securing the said parallel portion of the ferrule to the container.

9. In a container, the combination of a container body and an end closure of fibrous material, the end closure having an inner and an outer face, and a toothed metallic ferrule, the said teeth of the ferrule being bent at substantially a right angle intermediate of their ends, the said ferrule comprising a portion thereof in engagement with and parallel to the exterior side walls of the container adjacent an end and extending to the said end of the container body and in engagement therewith and inwardly at a right angle to the said parallel portion, then extending into engagement with and parallel to the inner side walls of the container for a distance substantially equal to the first mentioned parallel portion, then extending radially inwardly in engagement with the outer face of the end closure adjacent the periphery thereof and at a right angle to the second mentioned parallel portion of the ferrule, and the said right angled teeth of the ferrule passing completely through the fibrous end closure and beyond the inner face of the end closure adjacent the latter's periphery and the ends of the teeth clenched against and substantially parallel to the inner face of the end closure, whereby the end closure thus secured is held seated against the inner face portion of the radially inwardly extending portion of the ferrule.

10. A container as claimed in and by claim 9, whereby the ferrule is permanently secured to the side walls of the container by swedging the free end of the parallel portion in engagement with the exterior side walls of the container into the fibrous container.

11. A container as claimed in and by claim 9, whereby the container is of the sifter type by providing openings in one end closure, and means for closing said openings until said container is to be used as a sifter dispenser.

12. A container as claimed in and by claim 9, whereby the container is of the sifter type of providing openings in one end closure, and means for closing said openings comprising a label or similar puncturable means disposed on the outer or on the inner face of the end closure or on both inner and outer faces of the end closure to prevent the contents of the container from leaking out through the said openings until said puncturable means is fractured.

13. A combination fibrous and metal container end comprising a fibrous end closure and a metal ferrule, the said ferrule being secured to said end closure by a plurality of teeth, said teeth being bent substantially at a right angle intermediate of their ends, and the right angled portions of the said teeth passing entirely through and clenched to said end closure.

14. The method of preparing a combination fibrous and metal end closure for a container comprising forming a toothed metallic ferrule into the desired shape, then bending the teeth of the ferrule at substantially a right angle intermediate of their ends and passing the said right angled portion of the teeth of the ferrule into, through, and beyond one face of the fibrous end closure and clenching the teeth thereto to fixedly secure the ferrule to the fibrous end closure.

CHARLES T. WALTER.